(12) United States Patent
Ter Weeme et al.

(10) Patent No.: US 9,249,965 B2
(45) Date of Patent: Feb. 2, 2016

(54) LIGHTING DEVICE

(75) Inventors: Berend Jan Willem Ter Weeme, Eindhoven (NL); Remco Yuri Van De Moesdijk, Geldrop (NL); Marcus Joannes Van Den Bosch, Shanghai (CN); Yan Xiong, Shanghai (CN); Xiaoqing Duan, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 180 days.

(21) Appl. No.: 13/978,549

(22) PCT Filed: Jan. 11, 2012

(86) PCT No.: PCT/IB2012/050134
§ 371 (c)(1),
(2), (4) Date: Sep. 16, 2013

(87) PCT Pub. No.: WO2012/095798
PCT Pub. Date: Jul. 19, 2012

(65) Prior Publication Data
US 2014/0001956 A1    Jan. 2, 2014

(30) Foreign Application Priority Data

Jan. 14, 2011    (WO) ................ PCT/CN2011/070271

(51) Int. Cl.
*H01J 7/24*        (2006.01)
*F21V 29/00*     (2015.01)
*F21K 99/00*    (2010.01)
(Continued)

(52) U.S. Cl.
CPC ................. *F21V 29/26* (2013.01); *F21K 9/135* (2013.01); *F21V 3/02* (2013.01); *F21V 29/004* (2013.01); *F21V 29/15* (2015.01); *F21V 29/505* (2015.01); *F21V 29/506* (2015.01); *F21V 29/71* (2015.01); *F21V 29/713* (2015.01); *F21V 29/717* (2015.01); *F21V 29/773* (2015.01);
(Continued)

(58) Field of Classification Search
CPC ........ F21V 29/26; F21V 29/004; H01J 61/52; H01J 61/523; H01J 65/044; F21Y 2101/02; F21K 9/00
USPC ........ 315/113, 112, 32, 31; 362/294, 547, 84, 362/310, 307, 235; 313/46, 498; 327/512, 327/513
See application file for complete search history.

(56) References Cited

U.S. PATENT DOCUMENTS

| 4,858,071 A | 8/1989 | Manabe et al. |
| 5,900,649 A | 5/1999 | Effelsberg |

(Continued)

FOREIGN PATENT DOCUMENTS

| DE | 10162404 A1 | 7/2003 |
| DE | 202010009679 U1 | 9/2010 |

(Continued)

*Primary Examiner* — Lincoln Donovan
*Assistant Examiner* — Thomas Skibinski
(74) *Attorney, Agent, or Firm* — Yuliya R. Mathis

(57) ABSTRACT

There is provided a lighting device 100 comprising a light source, a driver arranged for powering the light source, which is separated in space from the light source. The lighting device has two separate heat sinks, a light source heat sink 112 to which the light source is thermally coupled, and a driver heat sink 115 to which the driver is thermally coupled. The light source heat sink and the driver heat sink are separated by an air gap 114 to provide thermal decoupling of the light source heat sink and the driver heat sink.

8 Claims, 4 Drawing Sheets

(51) Int. Cl.
*F21V 3/02* (2006.01)
*F21V 29/15* (2015.01)
*F21V 29/505* (2015.01)
*F21V 29/506* (2015.01)
*F21V 29/71* (2015.01)
*F21V 29/77* (2015.01)
*F21V 29/83* (2015.01)
*F21Y 101/02* (2006.01)
*F21Y 103/02* (2006.01)

(52) U.S. Cl.
CPC ............ *F21V 29/83* (2015.01); *F21Y 2101/02* (2013.01); *F21Y 2103/022* (2013.01)

(56) References Cited

U.S. PATENT DOCUMENTS

| | | | |
|---|---|---|---|
| 6,822,325 | B2 | 11/2004 | Wong |
| 7,781,826 | B2 | 8/2010 | Mallikararjunaswamy et al. |
| 7,781,828 | B2 | 8/2010 | Stecher |
| 8,884,517 | B1 * | 11/2014 | Shum et al. ............... 315/32 |
| 2005/0047170 | A1 | 3/2005 | Hilburger et al. |
| 2007/0230185 | A1 | 10/2007 | Shuy |
| 2008/0024067 | A1 * | 1/2008 | Ishibashi ............... 315/112 |
| 2008/0117637 | A1 * | 5/2008 | Chang et al. ............... 362/294 |
| 2009/0175041 | A1 * | 7/2009 | Yuen et al. ............... 362/294 |
| 2009/0323348 | A1 | 12/2009 | Shuai et al. |
| 2010/0039013 | A1 * | 2/2010 | Tsai ............... 313/46 |
| 2010/0073944 | A1 | 3/2010 | Chen |
| 2010/0213809 | A1 | 8/2010 | Roehl et al. |
| 2011/0169406 | A1 * | 7/2011 | Weekamp et al. ............... 315/32 |

FOREIGN PATENT DOCUMENTS

| | | |
|---|---|---|
| GB | 2464484 A | 4/2010 |
| JP | 200544766 A | 2/2005 |
| JP | 2005093097 A | 4/2005 |
| JP | 2009293526 A | 12/2009 |
| KR | 100926772 B1 | 11/2009 |
| WO | 2009012806 A1 | 1/2009 |
| WO | 2009069894 A2 | 6/2009 |
| WO | 2009148449 A1 | 12/2009 |
| WO | WO 2010032181 A1 * | 3/2010 |
| WO | 2010066841 A1 | 6/2010 |
| WO | 2010089397 A1 | 8/2010 |
| WO | 2010089696 A2 | 8/2010 |

* cited by examiner

LIGHTING DEVICE

FIELD OF THE INVENTION

The present invention relates generally to a lighting device, and more particularly to a lighting device with separated light source and driver.

BACKGROUND OF THE INVENTION

Light-emitting-diode (LED) lamps are known in the art. A LED lamp is a lamp that uses LEDs as the source of light. In such lamps, multiple diodes may be used for e.g. for increasing the output power of the lamp or for providing a white light when utilizing LEDs that emit light in a narrow band of wavelengths (as opposed to for instance using phosphor converted LEDs, which may emit light in the whole visible spectrum, thereby providing a more-or-less white light). LED lamps may be used for general lighting or even more specific lighting as the color and the output power may be tuned.

Generally, a lamp or a lighting device comprises a light source arranged to generate light, which light source is arranged at, or at least connected to, a driver circuitry arranged in a housing. Further, the light source is arranged within an encapsulating envelope usually having the shape of a bulb. In addition to providing maximum light output and/or a specific color of light, the design of a lighting device needs to take into account the evacuation of heat generated by the light source and the driver. Lifetime and reliability of e.g. LEDs and the driver components are important product characteristics, which are strongly connected to the operating temperatures of the involved components.

A prior art retrofit light bulb lamp is typically realized with a retrofit cap, e.g. of bayonet type or an Edison screw type, which is mechanically connected to a lamp housing in which a driver is arranged. The driver comprises the necessary electronics to drive a light source of the lamp. The light source is typically arranged within an envelope, being a glass bulb, so that light being generated by the light source may exit the lamp via the glass bulb. The lighting device comprises two main heat sources: the driver and the light source. When the light source comprises remote phosphor LEDs, also the remote phosphor generates some amount of heat. To carry off the heat generated in the driver and the light source, they are connected to a heat sink. Typically the lamp housing is used for cooling the lamp, e.g. it is designed to be a heat sink for the driver and the light source.

WO 2009/012806 A1 discloses a lamp comprising at least one light source, which is arranged on top of, and being thermally coupled to, a hollow cooling body, i.e. a heat sink, arranged within the lamp housing, which is connected to the cap. The cooling body is arranged such that heat can be dissipated from the light source. The cooling body is further arranged to, at a position separated from the top of the cooling body, fixate a supply board, i.e. a driver, such that the supply board is separated from the lighting unit. The cooling body is arranged such that heat can be dissipated also from the supply board. Although being separated from each other, the heat generated by the main heat sources of the lighting device is dissipated from the same cooling body, and the heat generated in e.g. the light source will thus influence the temperature of the driver.

SUMMARY OF THE INVENTION

It is an object of the present invention to provide an improved lighting device, with a better ability to cool the individual heat sources in a lighting device.

This object is achieved by a lighting device according to the present invention as defined in the appended independent claim. Preferred embodiments are set forth in the dependent claims and in the following description and drawings.

Thus, in accordance with the present inventive concept, there is provided a lighting device comprising: a light source, a driver arranged for powering the light source, which is separated in space from the light source, a light source heat sink to which the light source is thermally coupled, a driver heat sink to which the driver is thermally coupled. The light source heat sink and the driver heat sink are separated by an air gap to provide thermal decoupling of the light source heat sink and the driver heat sink.

In this manner, a lighting device is achieved in which the thermal heat management of the light source and the driver is basically split up in two. Thereby, the most critical component in terms of lifetime, which here is the driver, as it is more sensitive to high temperatures than the light source, being for instance a LED, can be managed by a heat sink which is more or less isolated from the heat generated by the light source. Thus, the temperature of the driver can be decreased and the overall system reliability and life time of the lighting device is increased.

Further, by decoupling the light source heat sink and the driver heat sink with an air gap, the total heat sink area for cooling the housing by means of air convection is increased.

According to an embodiment of the lighting device, the air gap is arranged in fluid communication with ambient air, thereby allowing a thermally induced air stream in the gap between the heat sinks, meaning that air can flow or can be exchanged between the air gap and the ambient, such that an increased air cooling of the lighting device is achieved.

According to an embodiment of the lighting device, it further comprises a cooling channel extending from an air inlet and to the air gap. Thereby, means for additional air cooling of the lighting device is provided, which is advantageous.

According to an embodiment of the lighting device, it further comprises an envelope for enclosing the light source. The cooling channel is arranged in a reflector of the envelope or in the envelope itself. Thereby, heat induced in the light source, can drive an air flow in the cooling channel and the air gap thereby increasing the amount of heat being removed from the respective heat sink.

According to an embodiment of the lighting device, the driver heat sink further comprises a protruding portion arranged to extend inside the cooling channel, thereby increasing the heat sink area of the driver heat sink and providing air cooling of the same in the cooling channel, which is advantageous.

According to an embodiment of the lighting device, the protruding portion of the driver heat sink is pole-shaped, which is advantageous for fitting into the air channel.

According to an embodiment of the lighting device, the light source heat sink and the driver heat sink are arranged having a respective preselected cooling surface selected to meet the respective cooling requirements of the light source and the driver. Thus, by providing thermally decoupled heat sinks for the different heat sources, in addition to allowing increased cooling surface (i.e. increased heat sink area) of the heat sinks, further an individual optimization for thermal management of each heat source according to its own cooling requirements is facilitated. The individual optimization may be done by arranging a preselected cooling surface for the light source heat sink and the driver heat sink, respectively. That is, by increasing the cooling surface of the driver heat sink, the temperature of the driver is decreased, thereby increasing the reliability and lifetime of the driver. Since e.g. a retro fit lamp will have a certain predetermined size requirement, and therefore a limited budget for thermal losses, the increased cooling surface for the driver heat sink may simultaneously lead to selecting a decreased cooling surface for the light source heat sink. However, this will not significantly decrease the lifetime and reliability of the light source since it is less sensitive to high temperatures.

According to an embodiment of the lighting device, the light source heat sink and/or the driver heat sink further comprise cooling fins, which cooling fins further increase the cooling surface of the respective heat sink.

According to an embodiment of the lighting device, the light source further comprises a reflector onto which cooling fins are arranged, which is advantageous.

According to an embodiment of the lighting device, the light source comprises at least one light emitting diode, LED, which is advantageous.

According to an embodiment of the lighting device, it further comprises at least one separating body. The separating body may be made of a material with low thermal conductivity, and is arranged for providing the air gap formed between the light source heat sink and the driver heat sink.

These and other aspects, features, and advantages of the invention will be apparent from and elucidated with reference to the embodiments described hereinafter.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The present invention will now be described more fully hereinafter with reference to the accompanying drawings. The below embodiments are provided by way of example so that this disclosure will be thorough and complete, and will fully convey the scope of the invention to those skilled in the art. Like numbers refer to like elements throughout.

The lighting device according to the present invention is in the following exemplified with a retrofit light bulb lamp based on LEDs. This includes single LEDs, multicolor LEDs, phosphor-LEDs, LED packages comprising multiple LEDs etc. Further, the present inventive concept is applicable for both solid state light emitting diodes and organic light emitting diodes, OLEDs.

Figure 1:
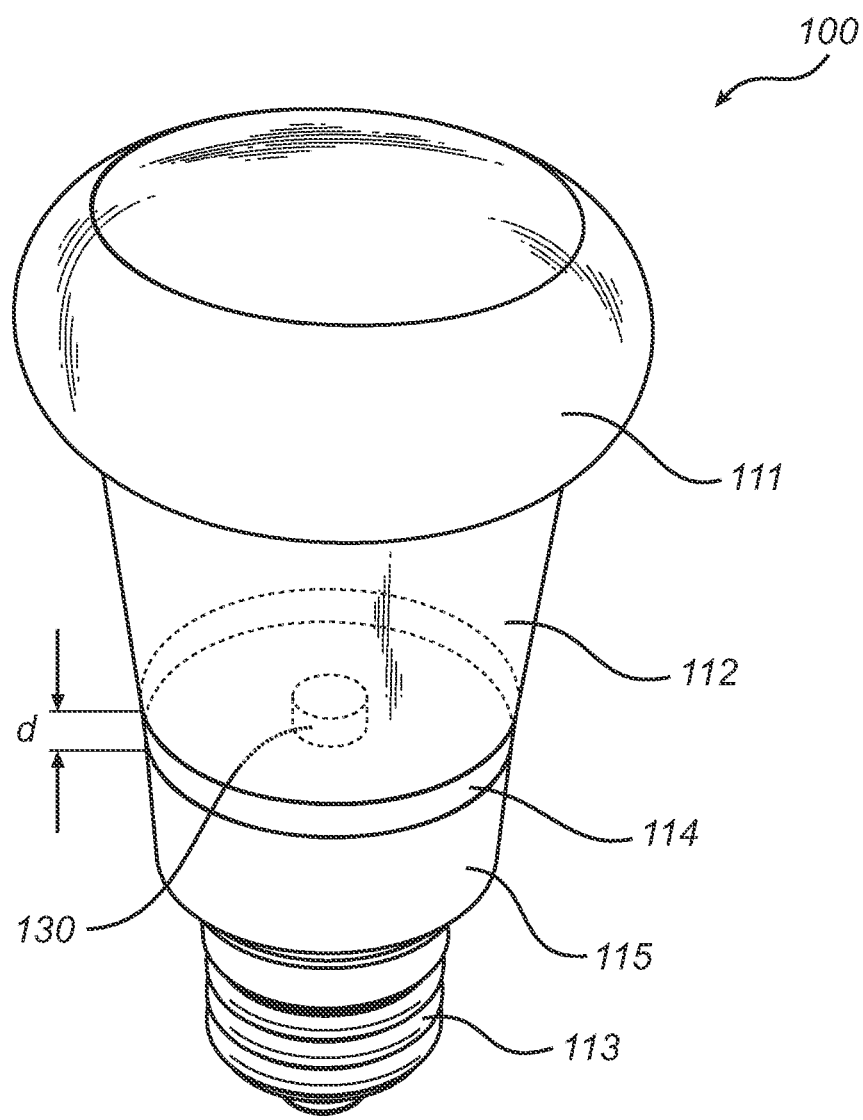
FIG. 1 is schematic perspective side view illustration of an embodiment of the lighting device according to the present inventive concept.

FIG. 1 illustrates a lighting device 100 according to the present inventive concept. The lighting device 100 is in the shape of a retrofit light bulb lamp, and is based on solid state light sources, LEDs (not visible in FIG. 1). The lighting device 100 comprises a conically shaped driver heat sink 115 arranged on a retrofit cap 113, which is here an Edison screw cap. Another typical cap applicable for the lighting device is e.g. a bayonet type cap. The cap 113 is arranged for electrically and mechanically connecting the lighting device 100 to a light fitting (not shown).

The driver heat sink 115 is hollow and has the functionality of being the driver housing. The driver heat sink 115 is here made of aluminum, however other suitable materials include other suitable metals, thermal plastics, regular plastics, and ceramics. Inside the driver heat sink 115, the driver circuitry for driving the LEDs is located. On top of the driver heat sink 115, a light source heat sink 112 is arranged, which is separated a distance d from the driver heat sink 115 by means of an insulating distance portion 130 which is further arranged for providing a channel for electrical connections between the light sources and the driver circuitry (not visible). The air gap 114 provides a thermal decoupling of the light source heat sink 112 and the driver heat sink 115. On top of the light source heat sink 112 a bulb 111 made of glass is arranged to encompass light sources being LED packages arranged on top of a printed circuit board, PCB. In an alternative embodiment the light source comprises LEDs arranged directly on the PCB in a Chip On Board, COB, configuration. The PCB is mounted on top of, and in thermal connection with, the light source heat sink 112, and is as mentioned above further electrically connected to the driver, which comprises the electronic components for powering of the light sources, via the distance portion 130.

Figure 2:
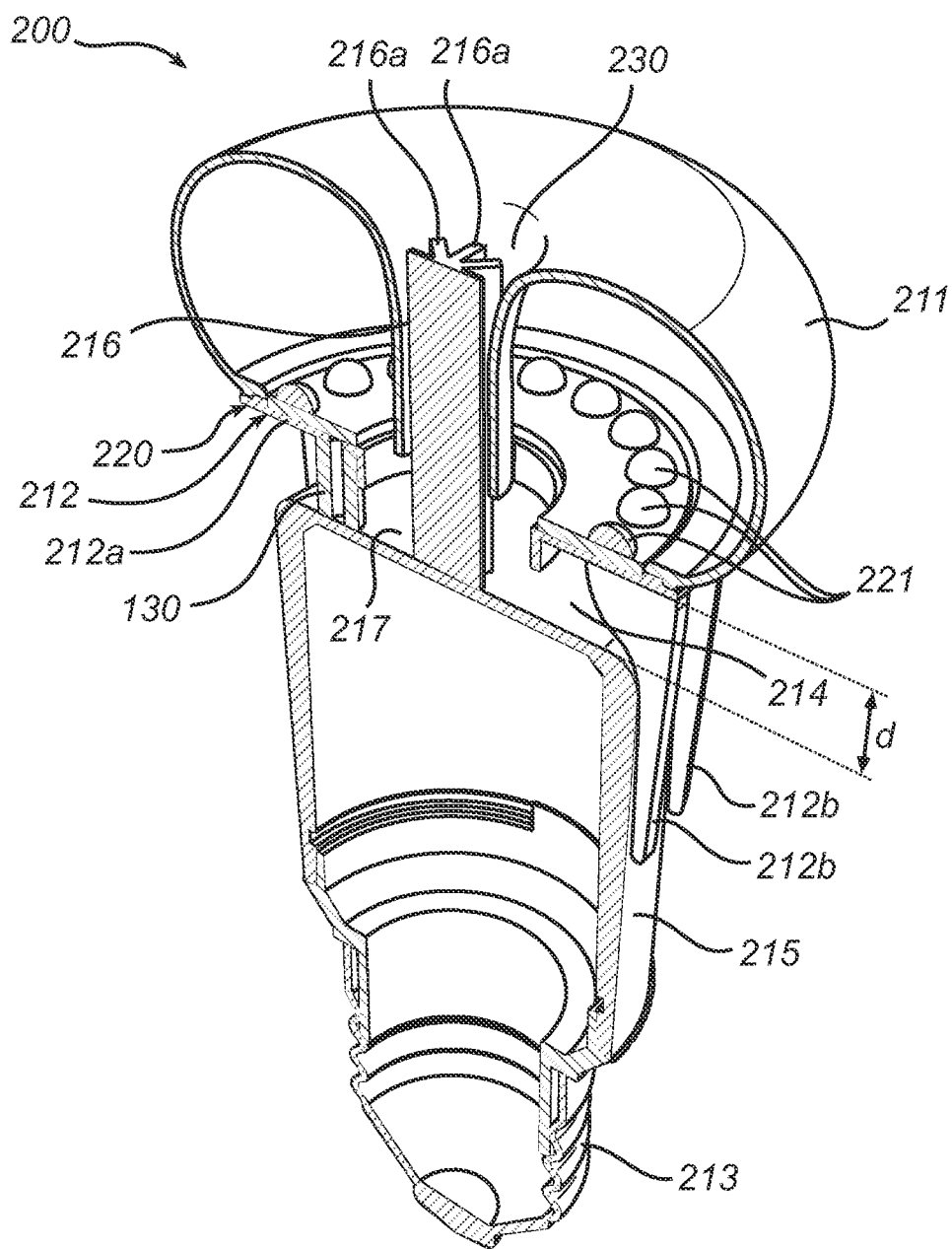
FIG. 2 is cut open perspective side view illustration of an embodiment of the lighting device according to the present inventive concept.

According to an embodiment of the lighting device, as depicted in a cut open view in FIG. 2, the lighting device 200, comprises a cap 213 of Edison screw type arranged at the bottom of the lighting device 200. The cap 213 is connected to a driver heat sink 215 arranged for holding the driver circuitry (not shown). The driver heat sink 215 is hollow and shaped like a frustrated cone, having a closed top surface 217. At a centre of the top surface 217 a protruding cooling portion 216 is arranged extending perpendicularly and upwards from the top surface 217. The cooling portion 216 is here a pole shaped elongated cooling body arranged with alongside extending cooling fins 216a. Other shapes of the cooling portion are applicable within the inventive concept. Further, in an alternative embodiment, the protruding portion is not present at all.

To continue, the lighting device 200 further comprises a light source heat sink 212, which here comprises a ring shaped metal plate 212a arranged in parallel with the top surface 217 of the driver heat sink 215. An air gap 114 is formed between the plate 212a of the light source heat sink 212 by means of at least one insulating portion 130 being arranged in-between them, and creating a distance d. The outer diameter of the plate 212, is larger than the outer diameter of the top surface 217 of the driver heat sink 215. The light source heat sink 212 further comprises a plurality of cooling fins 212b, which are arranged distributed along the outer rim of the plate 212a, and extending downwards, and substantially parallel with the driver heat sink 215. The inner diameter of the heat sink plate 212 is arranged to be larger than the diameter of the cooling portion 216 of the driver heat sink 215.

In an alternative embodiment of the light source heat sink above, the cooling fins 212b extending downwards from the heat sink plate 212a as described above is replaced with an outer hollow cylinder (not shown), such that an air gap is formed between the outer cylinder and the driver heat sink.

To continue with reference to FIG. 2, on top of the light source heat sink plate 212a, a light source 220 is arranged. The light source 220 is a ring shaped PCB onto which a plurality of LEDs 221, here being white LEDs, are mounted. A glass envelope, herein after referred to as the bulb 211 is arranged onto the light source heat sink 212, to encompass the light source 220. In an alternative embodiment, utilizing remote phosphor LEDs, blue LEDs are used in the light sources and a phosphor layer is arranged at an inner or outer part of the bulb.

The bulb 211, is here made of glass and is shaped like a truncated torus, and the centre hole of the bulb 211 provides an air channel 230 for fluid communication of air between the ambient and the air gap 214, that is, the air can flow easily between the ambient and the air gap 214. In an alternative embodiment, the bulb is formed to fully encompass the light source, that is the light source is fully sealed off from ambient air. Other suitable materials for the bulb are e.g. polymers, silicones and ceramics. The air channel 230 further encompasses the cooling portion 216 of the driver heat sink (when present, see alternative embodiment above). Thereby, during operation of the lighting device 200, the cooling portion 216 and the air gap 214 is exhibited to an air flow driven by the temperature difference in the lighting device 200. Ambient air flows into the lighting device 200 from the top of the bulb 211, into the air channel 230 and exits through the air gap to the outside. Thereby, a stream of cold ambient air is applied to exposed surface areas of the light source heat sink 212, the cooling portion 216 and the top surface 217 of the driver heat sink 215, providing an effective thermal convection cooling of the lighting device.

Figure 3A:
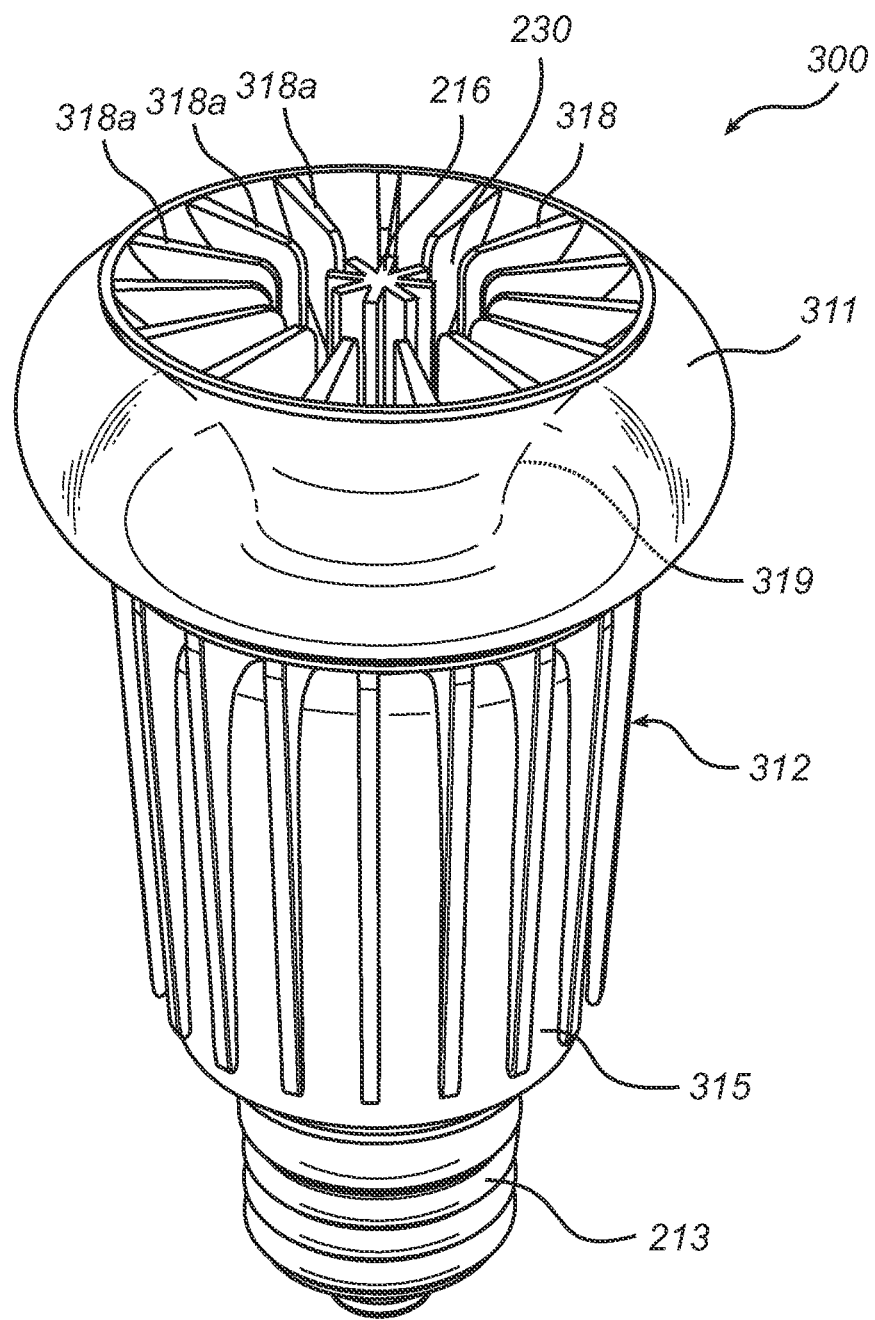
FIG. 3a is a perspective side view illustration, and 3b is an exploded perspective side view, of an embodiment of a lighting device according to the present inventive concept.
Figure 3B:
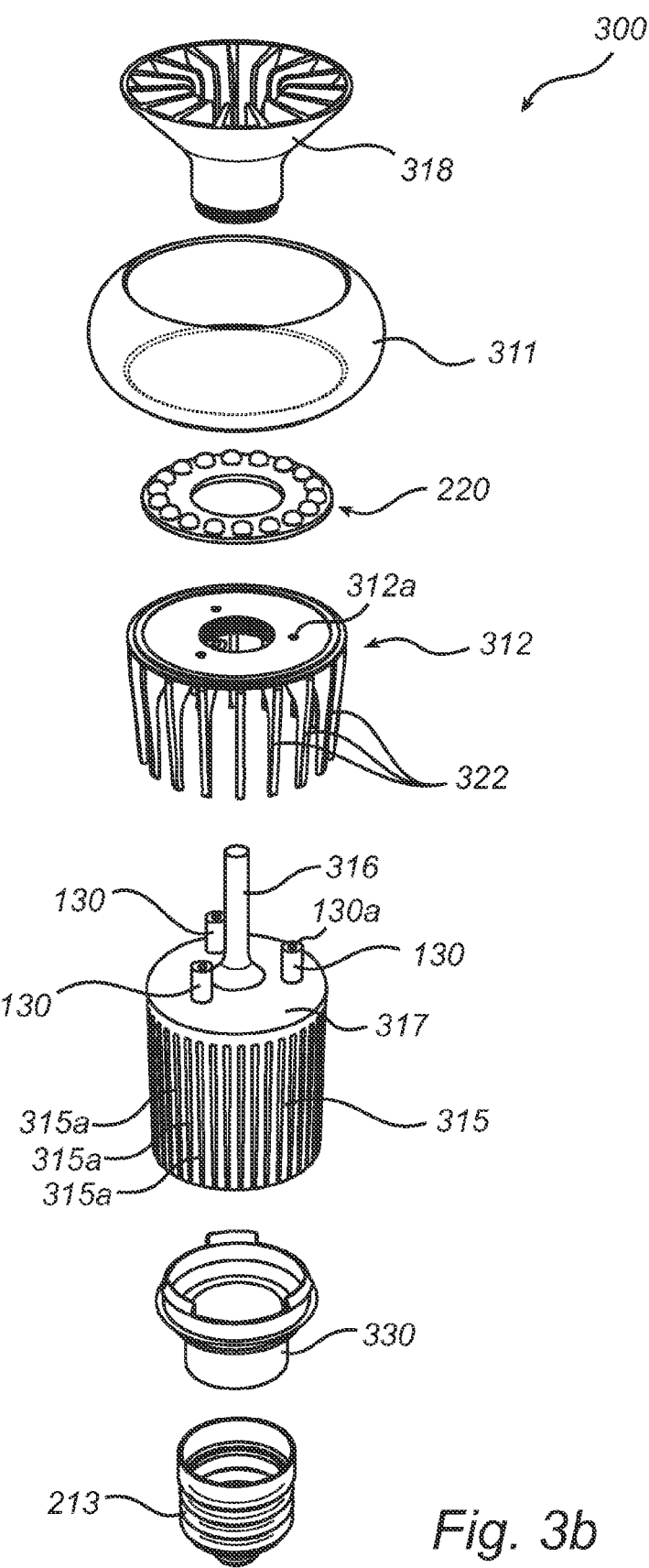

According to an embodiment of the lighting device, as illustrated in FIGS. 3a and 3b, there is provided a lighting device 300 with the same basic structure as described for lighting device 200, with reference to FIG. 2, but which lighting device 300 further comprises a reflector 318 arranged in the centre of a bulb 311 of the lighting device 300. The reflector 318 is a truncated trumpet shaped aluminum body having its base arranged to fit the inner diameter of the plate 212a. The reflector 318 is positioned in the bulb 311 to reflect outwards light rays emanating from the LEDs 221. The outer surface 319 of the reflector 318 is here concavely curved with respect to the LEDs 221 and is provided with a highly reflective surface, which may be for example a mirrored surface, be silvered or covered with a white color. "White" is defined as the color that has no or little hue, due to the reflection of all or almost all incident light. The outer surface 319 of the reflector 318 may be, without limitation, a parabolic curve or a tulip-shaped curve, for example.

An alternative embodiment of the lighting device 200 as described with reference to FIG. 2 comprises a reflector arranged in the hole of the bulb 211. In a simple form, the reflector is arranged as e.g. a silvered center portion inside the bulb 211.

To continue with reference to the lighting device 300 in FIGS. 3a and 3b, the reflector 318 is further arranged having cooling fins 318a arranged spaced and extending in the vertical plane along the inner surface of the reflector 318 and in the horizontal plane the cooling fins 318a are arranged extending a predetermined length radially inwards towards the centre of the reflector 318. The predetermined length is selected such that the cooling fins 318a and the cooling portion 316, which is encompassed by the reflector, do not interfere physically. The design of for instance the reflector 318, the bulb 311, the air gap 214 and the cooling portion 216 is preferably preselected such that the air flow in the air channel 230 formed at the centre of the lighting device 300 is optimized.

In FIG. 3b parts of an embodiment of the lighting device 300 are illustrated in an exploded perspective view. First, at the bottom, the Edison screw cap 213 is shown, which is arranged to receive a shell 330 for electric isolation between the cap 213 and the live parts of the driver circuitry (not shown). The shell 330 is arranged to fit the driver heat sink 315, which here is provided with cooling fins 315a, to increase the surface area of the driver heat sink 315, i.e. the cooling area, thereby improving its capacity to cool the driver. A pole shaped cooling portion 316 is arranged on top of the top surface 317 of the driver heat sink 315, and here three insulating distance portions 130 are visible. The distance portions 130 are provided with through holes 130a to allow electrical connections between the driver and the light sources or alternatively for fastening the light source heat sink with e.g. screws (not shown). Corresponding apertures 312a are arranged on the light source heat sink 312. On top of the light source heat sink 312, the ring shaped light source 220 is arranged, which is then encompassed by the bulb 311, into which the reflector 318 is arranged.

Although the embodiments described above relate to a lighting device having a standard bulb shape, any other suitable shape may be envisaged.

Above, embodiments of the lighting device according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A lighting device comprising:
  a light source;
  a driver spatially separated from and configured for powering said light source;
  a light source heat sink to which said light source is thermally coupled; and
  a driver heat sink to which said driver is thermally coupled;
  wherein the light source heat sink and the driver heat sink are separated by an air gap to provide thermal decoupling of the light source heat sink and the driver heat sink,
    an envelope for enclosing said light source, the envelope defining a cooling channel extending from an air inlet to said air gap such that the air gap is arranged in fluid communication with ambient air via the cooling channel, wherein said cooling channel is arranged in a reflector of said envelope or in the envelope itself.

2. A lighting device according to claim 1, wherein said driver heat sink further comprises a protruding portion arranged to extend inside said cooling channel.

3. A lighting device according to claim 2, wherein said protruding portion of the driver heat sink is pole-shaped.

4. A lighting device according to claim 1, the light source heat sink and the driver heat sink are arranged having a respective preselected cooling surface selected to meet the respective cooling requirements of the light source and the driver.

5. A lighting device according to claim 1, wherein said light source heat sink and/or said driver heat sink further comprises cooling fins.

6. A lighting device according to claim 5, wherein said lighting device further comprises a reflector onto which cooling fins are arranged.

7. A lighting device according to claim 1, wherein said light source comprises at least one light emitting diode.

8. A lighting device according to claim 1, further comprising at least one separating body, said separating body providing said air gap.

* * * * *